(12) United States Patent  
Hinson

(10) Patent No.: US 9,487,120 B1
(45) Date of Patent: Nov. 8, 2016

(54) SPREADGATE FLOW ADJUSTER

(71) Applicant: Richard Hinson, Albemarle, NC (US)

(72) Inventor: Richard Hinson, Albemarle, NC (US)

( * ) Notice: Subject to any disclaimer, the term of this patent is extended or adjusted under 35 U.S.C. 154(b) by 0 days.

(21) Appl. No.: 14/923,643

(22) Filed: Oct. 27, 2015

(51) Int. Cl.
*B60P 1/26* (2006.01)
*E05F 5/06* (2006.01)

(52) U.S. Cl.
CPC ... *B60P 1/26* (2013.01); *E05F 5/06* (2013.01)

(58) Field of Classification Search
CPC .................................. B60P 1/26; E05F 5/06
USPC .. 298/1 B, 7, 23 M, 23 S, 23 A, 23 D, 17 B, 298/38; 280/763.1; 248/351
See application file for complete search history.

(56) References Cited

U.S. PATENT DOCUMENTS

| 2,208,691 | A |  | 7/1940 | Voth |  |
|---|---|---|---|---|---|
| D167,938 | S |  | 10/1952 | Grindstad |  |
| 3,062,587 | A |  | 11/1962 | Miller |  |
| 3,173,644 | A | * | 3/1965 | Burfiend | 298/17 B |
| 3,502,371 | A | * | 3/1970 | Cleveland | B60P 1/28 298/1 R |
| 4,468,065 | A |  | 8/1984 | Taniguchi |  |
| 4,723,817 | A |  | 2/1988 | Wallan |  |
| D311,856 | S |  | 11/1990 | Tousaw |  |
| 7,591,513 | B2 |  | 9/2009 | Morley |  |
| 8,714,657 | B1 |  | 5/2014 | McKinley |  |

FOREIGN PATENT DOCUMENTS

CA 2827420 A1 4/2014
WO WO2006113219 A3 12/2007

* cited by examiner

*Primary Examiner* — Stephen Gordon
(74) *Attorney, Agent, or Firm* — Kyle A. Fletcher, Esq.

(57) ABSTRACT

The spread gate flow adjuster is adapted for use with a dump trailer. The spread gate flow adapter is designed to regulate the flow and application of driveway stone for use in paved and unpaved driveways and parking lots. The spread gate flow adjuster is a latch that is designed to hold the dump gate of a dump trailer a predetermined distance from the closed position of the dump gate. This predetermined distance regulates the flow of the driveway stone released via the dump trailer. The spread gate flow adjusted further comprises a stop pin and a mounting structure.

12 Claims, 4 Drawing Sheets

SPREADGATE FLOW ADJUSTER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of latches and closures, more specifically, a device configured for use with dump trailers.

SUMMARY OF INVENTION

The spread gate flow adjuster is adapted for use with a dump trailer. The spread gate flow adapter is designed to regulate the flow and application of driveway stone for use in paved and unpaved driveways and parking lots. The spread gate flow adjuster is a latch that is designed to hold the dump gate of a dump trailer a predetermined distance from the closed position of the dump gate. This predetermined distance regulates both the flow of the driveway stone as well as the depth of the driveway stone released by the dump trailer.

These together with additional objects, features and advantages of the spread gate flow adjuster will be readily apparent to those of ordinary skill in the art upon reading the following detailed description of the presently preferred, but nonetheless illustrative, embodiments when taken in conjunction with the accompanying drawings.

In this respect, before explaining the current embodiments of the spread gate flow adjuster in detail, it is to be understood that the spread gate flow adjuster is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the spread gate flow adjuster.

It is therefore important that the claims be regarded as including such equivalent construction insofar as they do not depart from the spirit and scope of the spread gate flow adjuster. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
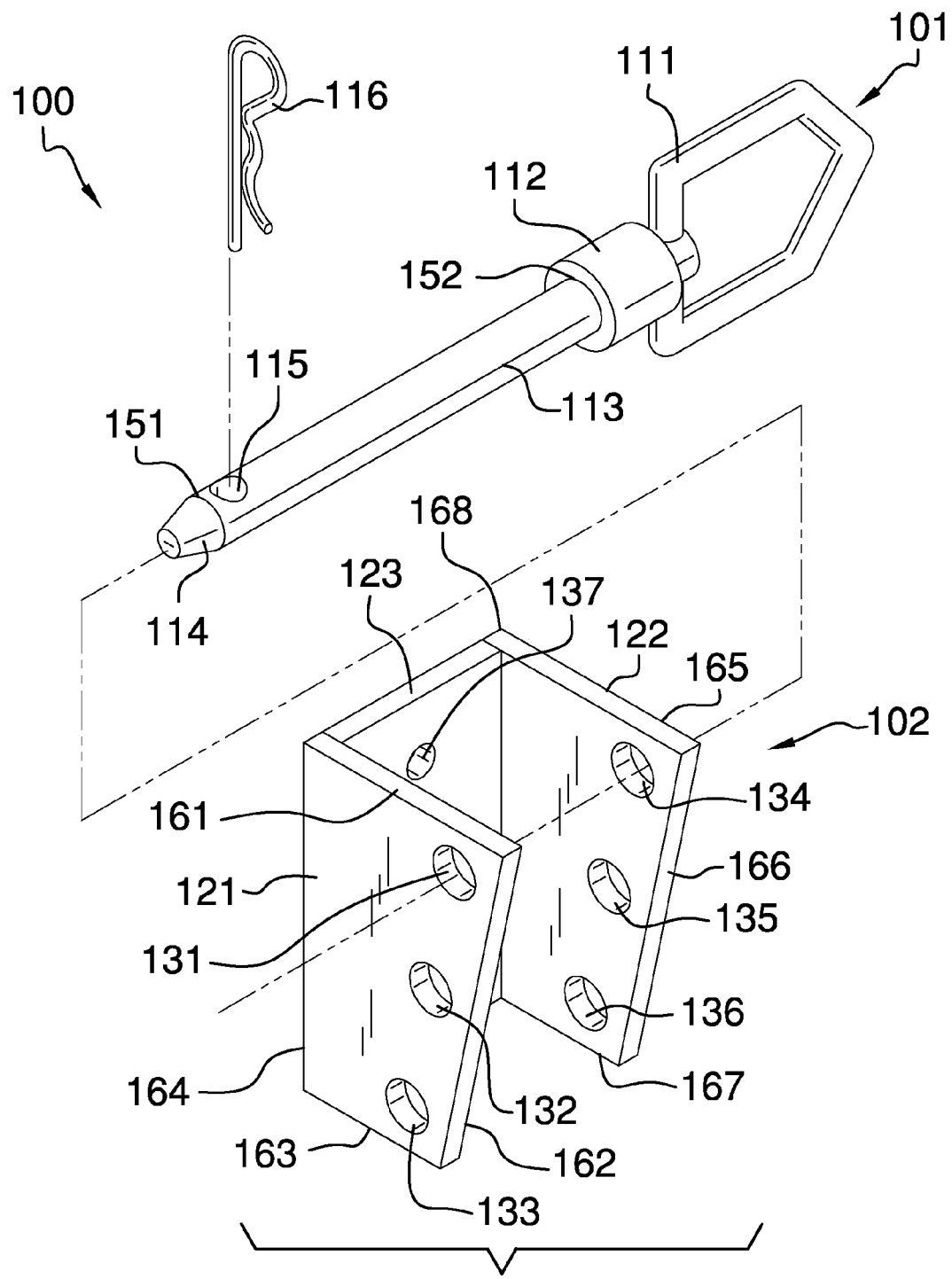
FIG. 1 is a perspective view of an embodiment of the disclosure.
Figure 2:
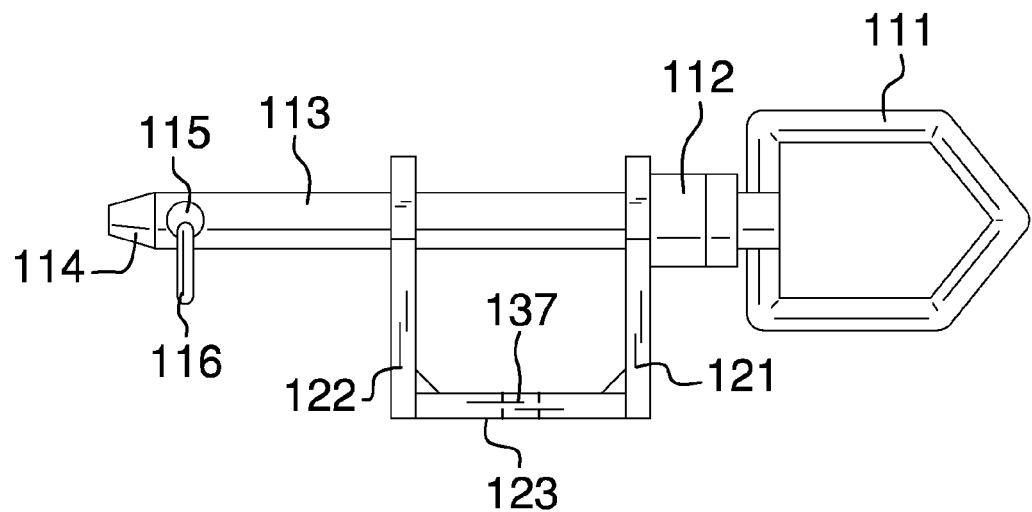
FIG. 2 is a top view of an embodiment of the disclosure.
Figure 3:
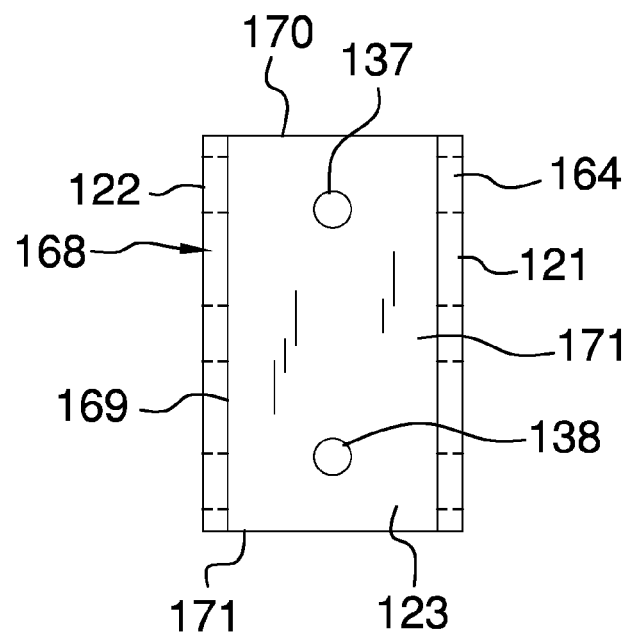
FIG. 3 is a back view of an embodiment of the disclosure.
Figure 4:
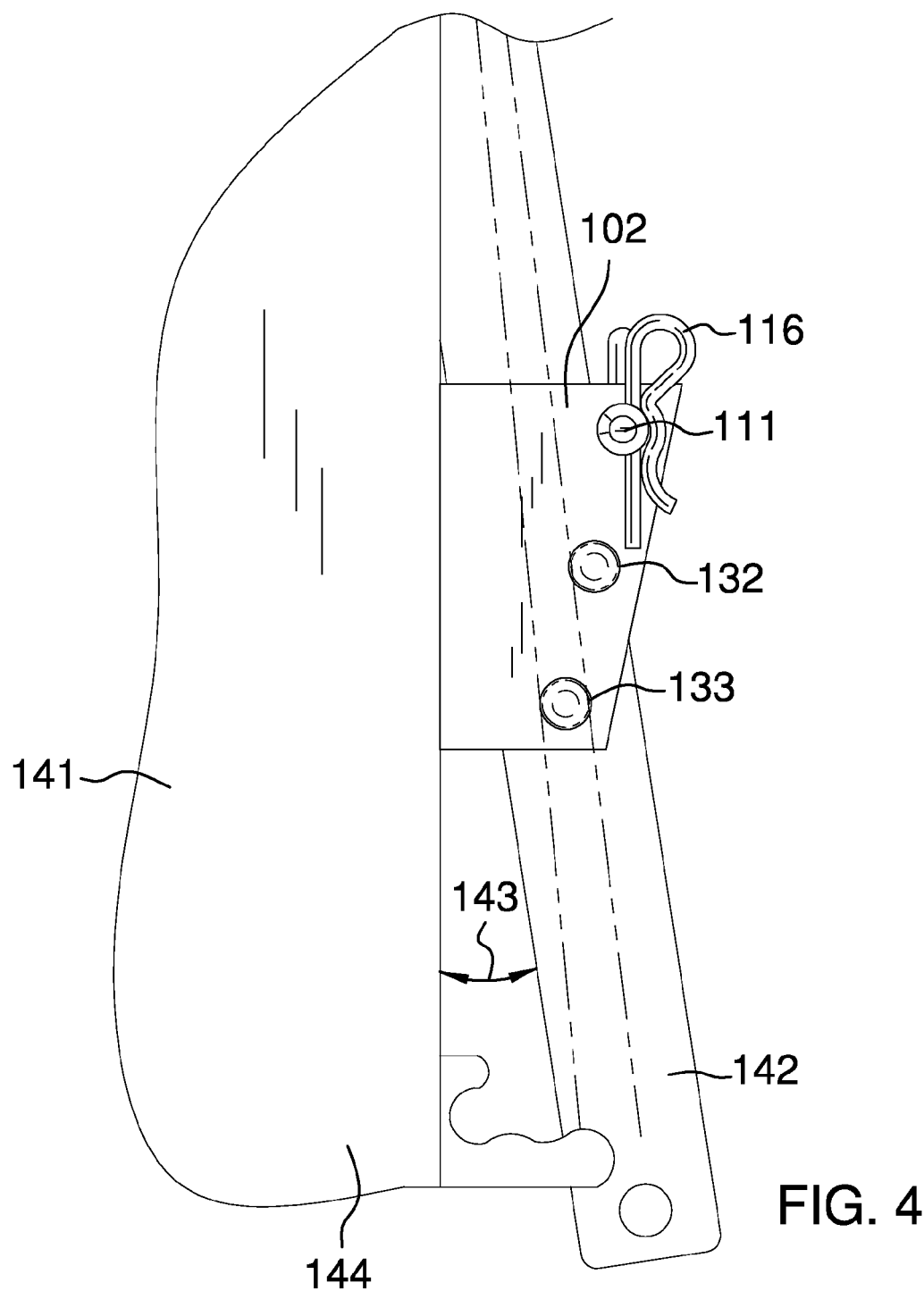
FIG. 4 is a side view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The spread gate flow 100 (hereinafter invention) adjuster further comprises a stop pin 101 and a mounting structure 102. The invention 100 regulates the flow and application of driveway stone released by a dump trailer 141. The invention 100 regulates this flow by physically limiting the rotation 143 of the dump gate 142 away from the dump trailer 141 when the dump trailer 141 is raised to release the driveway stone.

The stop pin 101 further comprises a handle 111, a bumper 112, a shaft 113, a taper 114, a lock hole 115, and a lock pin 116. The handle 111 is a triangular structure by which the stop pin 101 is designed to be handled and manipulated by the user. The shaft 113 is a metal bar that is further defined with a first end 151 and a second end 152. The handle 111 is mounted on the second end 152 of the shaft 113. The bumper 112 is a metal cylinder. The inner diameter of the bumper 112 is sized such that the bumper 112 can be slid over the shaft 113. The bumper 112 is slid over the first end 151 of the shaft 113 and slid along the length of the shaft 113 until it abuts against the handle 111. The surface of the bumper 112 is the structure that the dump gate 142 rests against when the rotation 143 of the dump gate 142 is restricted by the invention 100. The first end 151 of the shaft 113 is formed with a conically shaped taper 114. The taper 114 allows the stop pin 101 to be more readily inserted into the mounting structure 102. The mounting structure 102 is discussed in more detail elsewhere in this disclosure. As shown in FIG. 1, the lock hole 115 is a hole that is formed through the shaft 113 at a position proximal to the taper 114. The lock hole 115 is sized to receive a lock pin 116. The lock pin 116 is inserted through the lock hole 115 in order to hold the stop pin 101 in position when the stop pin 101 is inserted into the mounting structure 102. The lock pin 116 is a readily and commercially available cotter pin.

The mounting structure 102 further comprises a first plate 121, a second plate 122, and a base plate 123. The first plate 121 is a metal plate that is formed in the shape of a trapezoid. The first plate 121 further comprises a first hole 131, a second hole 132, and a third hole 133. The first plate 121 is further defined with a first side 161, a second side 162, a third side 163 and a fourth side 164. The first side 161 and the third side 163 are parallel to each other. The fourth side 164 forms a right angle to the first side 161 and the third side 163. The remaining side is the second side 162. The first hole 131, the second hole 132 and the third hole 133 are sized to receive the stop pin 101. The second plate 122 is identical to the first plate 121 and further comprises a fourth hole 134, a fifth hole 135 and a sixth hole 136. The second plate 122 is further defined with a fifth side 165, a sixth side 166, a seventh side 167 and an eighth side 168. The fifth side 165 and the seventh side 167 are parallel to each other. The eighth side 168 forms a right angle to the fifth side 165 and the seventh side 167. The remaining side is the sixth side 166. The fourth hole 134, the fifth hole 135 and the sixth hole 136 are sized to receive the stop pin 101.

The base plate 123 is a metal plate that is formed in the shape of a rectangle. The base plate 123 further comprises an seventh hole 137 and an eighth hole 138. The base plate 123 is further defined with a ninth side 169, a tenth side 170, an eleventh side 171 and a twelfth side 172. The fourth side 164 of the first plate 121 is attached to the eleventh side 171 of the base plate 123. The eighth side 168 of the second plate 122 is attached to the ninth side 169 of the base plate 123.

The position of the first hole 131 on the first plate 121 and the position of the fourth hole 134 on the second plate 122 are selected to receive the stop pin 101 in such a manner as to position the bumper 112 of the stop pin 101 such that it holds hold the dump gate 142 a first predetermined distance away from the dump trailer 141. The position of the second hole 132 on the first plate 121 and the position of the fifth hole 135 on the second plate 122 are selected to receive the stop pin 101 in such a manner as to position the bumper 112 of the stop pin 101 such that it holds hold the dump gate 142 a second predetermined distance away from the dump trailer 141. The span of the second predetermined distance is less than the span of the first predetermined distance. The position of the third hole 133 on the first plate 121 and the position of the sixth hole 136 on the second plate 122 are selected to receive the stop pin 101 in such a manner as to position the bumper 112 of the stop pin 101 such that it holds hold the dump gate 142 a third predetermined distance away from the dump trailer 141. The span of the third predetermined distance is less than the span of the second predetermined distance.

Figure 5:
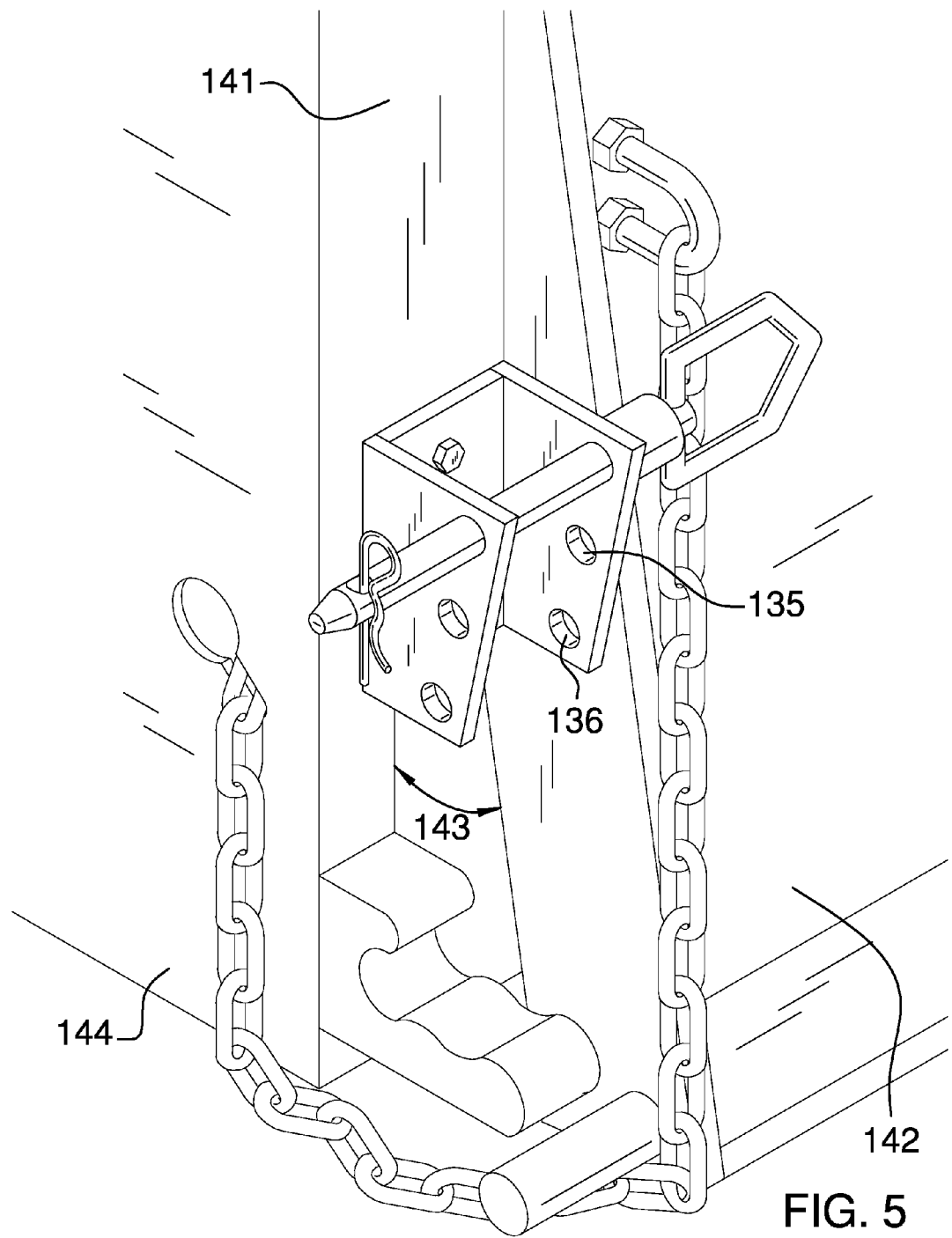
FIG. 5 is an in use view of an embodiment of the disclosure.

As shown in FIG. 5, to use the invention 100, the mounting structure 102 is attached to the body 144 of the dump trailer 141. The mounting structure 102 can be welded or bolted to the mounting structure 102. The mounting structure 102 is positioned on the dump structure such that the dump gate 142 will rest against the bumper 112 of the stop pin 101 when the invention 100 is in use. The stop pin 101 is the inserted through one of the following pairs of holes: the first hole 131 and fourth hole 134, the second hole 132 and fifth hole 135, or the third hole 133 and the sixth hole 136. When the dump trailer 141 is raised in order to distribute its load, the dump gate 142 will rotate 143 away from the dump trailer 141 in order to allow for the load to escape. When the invention 100 is in use, this rotation 143 will be limited when the dump gate 142 comes to rest against the bumper 112 of the stop pin 101.

In the first potential embodiment of the disclosure, the handle 111, bumper 112, and shaft 113 are formed from steel. The taper 114 is formed into the shaft 113 by grinding. The lock hole 115 is drilled through the shaft 113. The lock pin 116 is a readily and commercially available cotter pin. The handle 111, bumper 112, and shaft 113 are welded together. The first plate 121, the second plate 122, and the base plate 123 are formed from steel and welded together. The first hole 131, the second hole 132, the third hole 133, the fourth hole 134, the fifth hole 135, the sixth hole 136, the seventh hole 137, and the eighth hole 138 are drilled into their respective plates. The mounting structure 102 is welded to the dump trailer 141.

In the second potential embodiment of the disclosure the handle 111, bumper 112, shaft 113, taper 114, and lock hole 115 are cast as a single unit in iron. The lock pin 116 is a readily and commercially available cotter pin. The first plate 121, the second plate 122, the base plate 123, the first hole 131, the second hole 132, the third hole 133, the fourth hole 134, the fifth hole 135, the sixth hole 136, the seventh hole 137, and the eighth hole 138 are cast as a single unit from iron. The mounting structure 102 is bolted to the dump trailer 141.

The following definitions were used in this disclosure:
Inner Diameter: As used in this disclosure, the term inner diameter is used in the same way that a plumber would refer to the inner diameter of a pipe.
Outer Diameter: As used in this disclosure, the term outer diameter is used in the same way that a plumber would refer to the outer diameter of a pipe.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawing and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A regulator comprising:
a stop pin and a mounting structure;
wherein the regulator is adapted for use with a dump trailer;
wherein the regulator is adapted to regulate a flow and an application of driveway stone released via the dump trailer;
wherein the regulator is adapted to regulate the flow and the application of driveway stone released via said dump trailer by being adapted to physically limit a rotation of a dump gate away from the dump trailer when the dump trailer is raised to release the driveway stone;
wherein the flow and the application of driveway stone released by the dump trailer is adjustable;
wherein the stop pin further comprises a handle, a bumper, a shaft, a taper, a lock hole, and a lock pin;
wherein the shaft is a metal bar that is further defined with a first end and a second end;

wherein the bumper is a metal cylinder;
wherein an inner diameter of the bumper is sized such that the bumper can be slid over the shaft;
wherein the handle is mounted on the second end of the shaft;
wherein the bumper abuts against the handle;
wherein a surface of the bumper is a structure that the dump gate rests against when the rotation of the dump gate is restricted by the regulator.

2. The regulator according to claim 1 wherein the first end of the shaft is conically shaped.

3. The regulator according to claim 2 wherein the lock hole is a hole that is formed through the shaft.

4. The regulator according to claim 3 wherein the lock pin is a cotter pin.

5. The regulator according to claim 4 wherein the lock pin is inserted through the lock hole.

6. The regulator according to claim 5 wherein the mounting structure further comprises a first plate, a second plate, and a base plate.

7. The regulator according to claim 6 wherein
the first plate further comprises a first hole, a second hole, and a third hole;
wherein the first plate is further defined with a first side, a second side, a third side and a fourth side;
wherein the second plate is identical to the first plate and further comprises a fourth hole, a fifth hole and a sixth hole;
wherein the second plate is further defined with a fifth side, a sixth side, a seventh side and an eighth side;
wherein the base plate further comprises an seventh hole and an eighth hole;
wherein the base plate is further defined with a ninth side, a tenth side, an eleventh side and a twelfth side,
wherein the fourth side of the first plate is attached to the eleventh side of the base plate;
wherein the eighth side of the second plate is attached to the ninth side of the base plate.

8. The regulator according to claim 7 wherein
the first hole, the second hole and the third hole are sized to receive the stop pin;
wherein the fourth hole, the fifth hole and the sixth hole are sized to receive the stop pin.

9. The regulator according to claim 8 wherein
the position of the first hole on the first plate and the position of the fourth hole on the second plate are selected to receive the stop pin in such a manner as to position the bumper of the stop pin such that the stop pin is adapted to hold the dump gate a first predetermined distance away from the dump trailer;
wherein the position of the second hole on the first plate and the position of the fifth hole on the second plate are selected to receive the stop pin in such a manner as to position the bumper of the stop pin such that the stop pin is adapted to hold the dump gate a second predetermined distance away from the dump trailer;
wherein the position of the third hole on the first plate and the position of the sixth hole on the second plate are selected to receive the stop pin in such a manner as to position the bumper of the stop pin such that the stop pin is adapted to hold the dump gate a third predetermined distance away from the dump trailer.

10. The regulator according to claim 9 wherein
a span of the second predetermined distance is less than a span of the first predetermined distance;
wherein a span of the third predetermined distance is less than a span of the second predetermined distance.

11. The regulator according to claim 10 wherein the mounting structure is adapted to be attached to the body of the dump trailer.

12. The regulator according to claim 11 wherein the mounting structure is adapted to be positioned on the dump trailer such that a dump gate will rest against the bumper of the stop pin.

* * * * *